United States Patent
Jabado et al.

(10) Patent No.: US 8,518,485 B2
(45) Date of Patent: Aug. 27, 2013

(54) PROCESS FOR PRODUCING A COMPONENT OF A TURBINE, AND A COMPONENT OF A TURBINE

(75) Inventors: Rene Jabado, Berlin (DE); Daniel Körtvelyessy, Berlin (DE); Ralph Reiche, Berlin (DE); Michael Rindler, Schöneiche (DE)

(73) Assignee: Siemens Aktiengesellschaft, Munich (DE)

( * ) Notice: Subject to any disclaimer, the term of this patent is extended or adjusted under 35 U.S.C. 154(b) by 1115 days.

(21) Appl. No.: 11/794,516

(22) PCT Filed: Oct. 18, 2005

(86) PCT No.: PCT/EP2005/055331
§ 371 (c)(1),
(2), (4) Date: Nov. 9, 2009

(87) PCT Pub. No.: WO2006/072479
PCT Pub. Date: Jul. 13, 2006

(65) Prior Publication Data
US 2010/0047592 A1   Feb. 25, 2010

(30) Foreign Application Priority Data

Dec. 30, 2004 (EP) .................................. 04031008

(51) Int. Cl.
*C23C 26/00* (2006.01)
*C23C 28/00* (2006.01)
*C23C 4/02* (2006.01)
*C23F 1/00* (2006.01)
*F01D 5/28* (2006.01)

(52) U.S. Cl.
USPC .............. 427/255.26; 427/383.1; 427/255.23; 427/253

(58) Field of Classification Search
USPC ...................... 428/614–632; 134/2, 3, 26–29, 134/31, 41; 427/250, 252, 253, 255.23, 255.26
See application file for complete search history.

(56) References Cited

U.S. PATENT DOCUMENTS

| | | | |
|---|---|---|---|
| 5,614,054 A | 3/1997 | Reeves et al. | |
| 5,944,909 A | 8/1999 | Reeves et al. | |
| 6,024,792 A | 2/2000 | Kurz et al. | |
| 6,132,520 A | 10/2000 | Schilbe et al. | |
| 6,485,845 B1 * | 11/2002 | Wustman et al. | 428/633 |
| 2001/0039984 A1 * | 11/2001 | Nonomura et al. | 148/677 |
| 2002/0074017 A1 | 6/2002 | Schilbe et al. | |
| 2002/0198601 A1 | 12/2002 | Bales et al. | |
| 2004/0244817 A1 | 12/2004 | Czech et al. | |
| 2004/0247789 A1 | 12/2004 | Boucard et al. | |

FOREIGN PATENT DOCUMENTS

| | | | |
|---|---|---|---|
| DE | 199 60 353 A1 | | 6/2001 |
| EP | 1321536 | * | 6/2003 |
| WO | WO 99/67435 A1 | | 12/1999 |
| WO | WO 00/44949 A1 | | 8/2000 |

* cited by examiner

*Primary Examiner* — Gwendolyn Blackwell
*Assistant Examiner* — Xiaobei Wang

(57) ABSTRACT

The turbine parts, when they are used, form oxide layers which by the undesirable rapid growth thereof generate the damage of the parts substrate. The inventive method consists in depleting the part in an element in such a way that the oxide layer is reduced.

14 Claims, 5 Drawing Sheets

US 8,518,485 B2

PROCESS FOR PRODUCING A COMPONENT OF A TURBINE, AND A COMPONENT OF A TURBINE

CROSS REFERENCE TO RELATED APPLICATIONS

This application is the US National Stage of International Application No. PCT/EP2005/055331, filed Oct. 18, 2005 and claims the benefit thereof. The International Application claims the benefits of European application No. 04031008.8 filed Dec. 30, 2004, both of the applications are incorporated by reference herein in their entirety

FIELD OF INVENTION

The invention relates to a process for producing a component in which an oxide layer can form, and to a component.

BACKGROUND OF THE INVENTION

Components which are used at high temperatures often form an oxide layer, during which process "metallic" atoms diffuse out of the component to the component/metal oxide interface and this metal element is depleted in the component in the region below the oxide layer.

Gas turbine components which are exposed to hot gases are often protected by thermal barrier coatings on MCrAlX bonding layers. The bonding of the thermal barrier coating to the MCrAlX layer is substantially produced by an aluminum oxide layer between the MCrAlX layer and the thermal barrier coating. However, the aluminum oxide layer (thermally grown oxide—TGO) grows during operation, until ultimately the bonding fails.

The MCrAlX layers are often provided with a platinum plating, which as a diffusion barrier is supposed to slow down the growth of the TGO. One problem is that this process is expensive, since pure platinum is used and an additional coating process increases costs. A further problem is that during operation the platinum diffuses into the component substrate. However, during refurbishment of the component this leads to a change in the known refurbishment processes, since the platinum increases the attack of acid on the substrate.

SUMMARY OF INVENTION

Therefore, it is an object of the invention to provide a process for treating a component resulting in slower growth of an oxide layer on a component.

Furthermore, it is an object of the invention to provide a component in which an oxide layer is formed more slowly.

Further advantageous measures, which can advantageously be combined with one another in any desired way, are listed in the process and component subclaims.

DETAILED DESCRIPTION OF INVENTION

Figure 1:
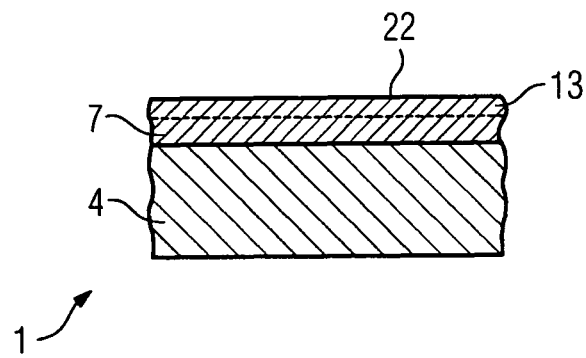
FIGS. 1, 2, 3 show a component that has been treated by means of the process according to the invention.

FIG. 1 shows an example of a component 1 which is treated by means of the process according to the invention.

The component 1 comprises, for example, a metallic substrate 4. The substrate 4 may be an elemental metal or an alloy. Of course, secondary phases may also be present.

In the case of components for turbines, such as for example turbine blades or vanes 120, 130 (FIG. 6), heat shield elements 155 (FIG. 7) of gas turbines 100 (FIG. 8) or steam turbines, the substrate 4 is an iron-base, cobalt-base or nickel-base superalloy.

By way of example, a corrosion-resistant layer or bonding layer 7 is present on the substrate 4. In the case of turbine components, this layer generally consists of an alloy of the MCrAlX type.

The corrosion-resistant layer 7 may also have been aluminized and/or chromized in the region of its outer surface 22, with the result that in the protective layer 7 a surface region 13 has formed with a higher concentration of aluminum and/or chromium than the other, underlying region of the corrosion-resistant layer 7.

Figure 2:
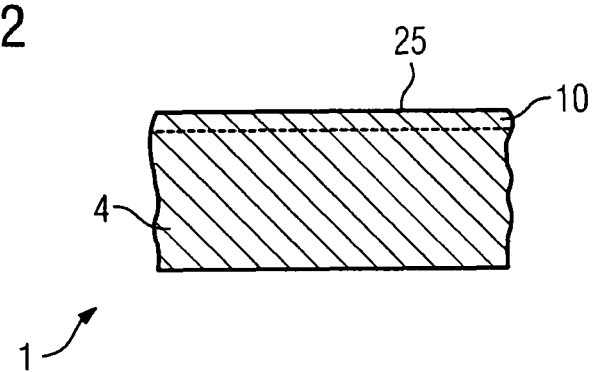

FIG. 2 shows an example of another component 1 which can be treated by means of the process according to the invention.

In this case, the component 1 does not have a corrosion-resistant layer and has for example been aluminized and/or chromized in the region of its outer surface 25, resulting in the formation of a surface region 10 which has a higher concentration of aluminum and/or chromium than the remainder of the substrate 4 (for example made from a superalloy).

An oxide layer $Me1_y Me2_z O_x$, and/or a mixture of $Me1O_x$ and $Me2O_x$ of at least one element Me1, Me2 forms on the substrate 4 or on the corrosion-resistant layer 7; the at least one element Me1, Me2 is, for example, a metal oxide-forming element ("metallic element"), in particular aluminum. In the case of aluminum, aluminum oxide $Al_2O_3$ is formed (Me1=Al, $_y$=2, z=0, x=3).

It is also possible for oxides of a plurality of elements Me1, Me2 to form, for example $Cr_2O_3$ and $Al_2O_3$ or mixed oxides, such as La—Al—O.

Figure 3:
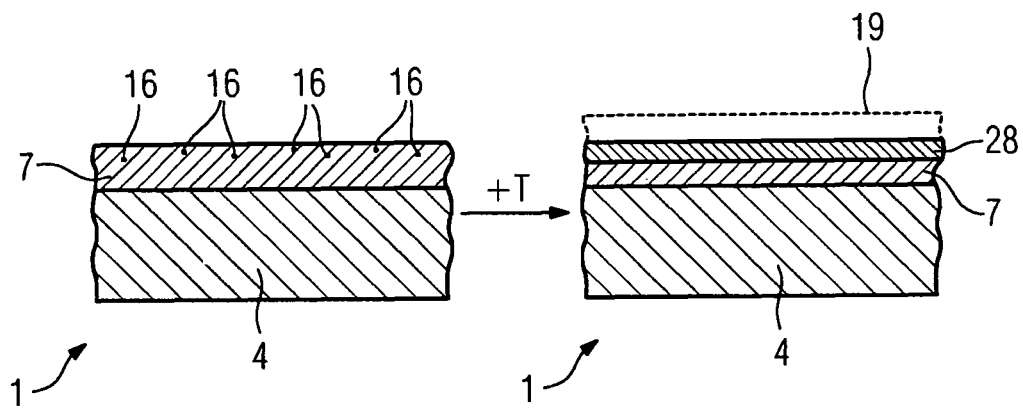

According to the invention, the corrosion-resistant layer 7, the aluminized corrosion-resistant layer 7, the substrate 4 or the aluminized substrate 4 is subjected to a treatment in which at least one element Me1, Me2 which forms an oxide layer 28 (FIG. 3) is depleted in the metal or the alloy. This leads to the formation of vacancies or locally depleted regions 16 in the crystal lattice.

There is no or scarcely any removal of material from a layer region at the surface 22, 25. Rather, it is merely regions that are depleted of this element Me1, Me2 which are formed in the corrosion-resistant layer 7 or the substrate 4 (not shown).

By way of example for an aluminized and/or chromized corrosion-resistant layer 7 or a substrate 4, the following applies: the layer region in which the element aluminum and/or chromium has been depleted is, however, preferably thinner than the layer region 10, 13 which has been aluminized or chromized.

In the case of the MCrAlX layers or a superalloy, the depleted elements are either aluminum or chromium or chromium and aluminum, which were depleted in the substrate 4 or the layer 7.

Prior to use, the surface 22, 25 treated in this way can be slightly pre-oxidized and forms the oxide layer 28, in which case a ceramic thermal barrier coating 19 (indicated by dashed lines on the right-hand side of FIG. 3) can then be applied. In use, i.e. at high temperatures T, the oxide layer 28 continues to grow on the corrosion-resistant layer 7.

However, the ceramic thermal barrier coating 19 may also be applied direct, without pre-oxidation, to the corrosion-resistant layer 7 or to the substrate 4 having the zones which have been depleted of the at least one element Me1, Me2. In this case, the oxide layer 28 forms during operation between the corrosion-resistant layer 7 and the ceramic thermal barrier coating 19.

Figure 4:
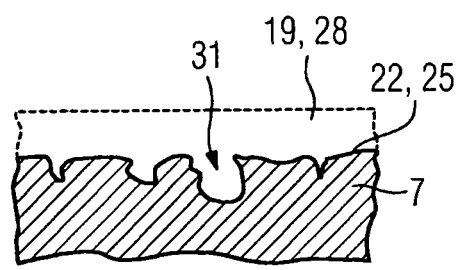
FIGS. 4, 5 show components according to the invention.

According to the invention, the depletion of the at least one element Me1, Me2 in the substrate 4 or the corrosion-resistant layer 7 is carried out, for example, by a treatment involving contacting with a treatment fluid, i.e. by means of one or more acids or bases or base mixtures, an electrolyte treatment (i.e. with the application of an electric voltage) or by exposing the component 1 to an environment containing at least one halogen, in particular fluorine or chlorine, or at least one halide, as is known from the fluoride ion cleaning process. As a result of this depletion, the TGO grows very much more slowly, in particular by up to about 20 µm per service cycle less than is known from the prior art, resulting in a gain of several thousand operating hours of the component 1 at high temperatures. The surface 22, 25 of the corrosion-resistant layer 7 or the substrate 4 can preferably be roughened by the treatment, resulting in the formation of fissures 31 (FIG. 4), giving better bonding of the ceramic thermal barrier coating 19, in particular a plasma-sprayed thermal barrier coating (APS: atmospheric plasma spraying, VPS: vacuum plasma spraying, LPPS: low-pressure plasma spraying).

Examples of corrosion-resistant layers 7 that can be used include those whose chemical compositions are known from EP 0 486 489 B1, EP 0 786 017 B1, EP 0 412 397 B1 or EP 1 306 454 A1, the chemical compositions of which corrosion-resistant layers are intended to form part of the subject matter of the present disclosure.

Figure 5:
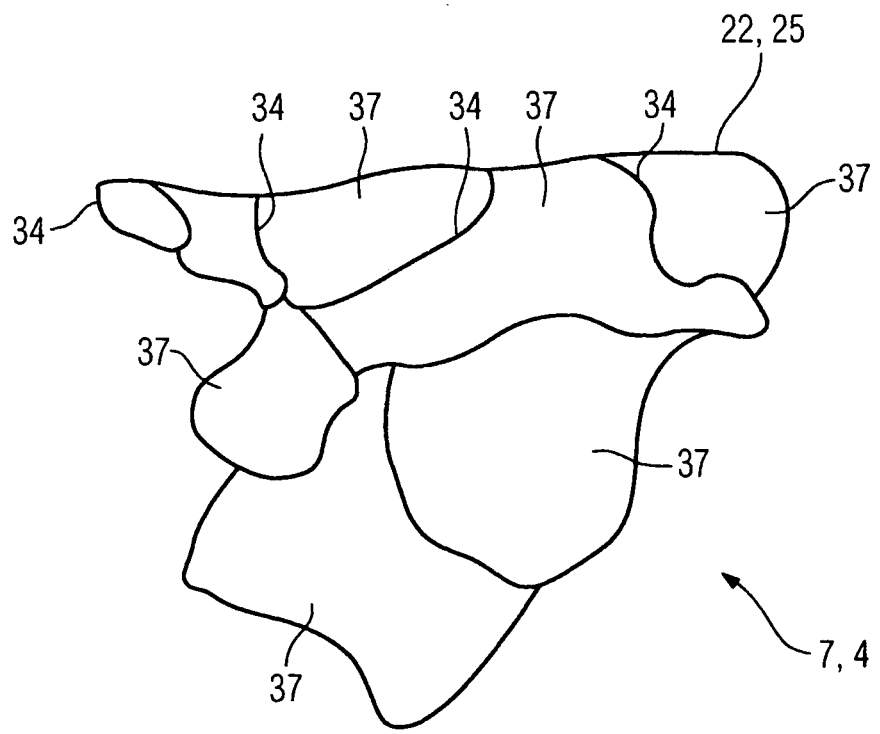

FIG. 5 shows an enlarged illustration of the corrosion-resistant layer 7 or of the substrate 4.

The corrosion-resistant layer 7 comprises, for example, individual grains 37 (granular or columnar) which have grain boundaries 34 with one another.

According to the invention, at least in certain locations an oxide layer, prepared in particular using the process according to the invention, has formed on the grain boundaries 34.

An acid, base or halogen attack takes place in particular into the grain boundaries 34, since the latter constitute weak points compared to the grain, so that an attack can preferentially take place at these grain boundaries. Then, during the coating with a ceramic thermal barrier coating 19 or during a pre-oxidation process carried out in the corrosion-resistant layer 7, a thin oxide film is formed within the grain boundaries 34 in the region of the surface 22, 29, reducing the diffusion of the at least one element Me1, Me2, in particular aluminum, along the grain boundaries 34, since the diffusion preferentially takes place along the grain boundaries 34, and the at least one element Me1, Me2 has a lower diffusion coefficient in the oxide of the grain boundaries 34.

Used corrosion-resistant layers 7 are completely removed for refurbishment, after which they are generally treated with an acid for 4-8 hours at an elevated temperature of 50° C.-80° C.

By contrast, the treatment times with an acid, a base, an electrolyte or a halogen/halide when using the process according to the invention are considerably shorter. They are reduced to 50%, in particular 25% of these standard treatment times and last at most 1 hour (h), in particular ½ h.

The treatment temperatures may remain the same but tend to be at the lower end of the temperature ranges used to remove corrosion-resistant layers.

The treatment time in a hydrochloric acid, for example with a concentration of 30%, is 30 minutes at 50° C. In the case of an electrolytic treatment, the concentration of the hydrochloric acid can be reduced, for example, to 5%, and the treatment time is also shorter, for example at 10 minutes. Depending on the size of the component, voltages of from 0.1 to 0.34 volts are applied.

Figure 6:
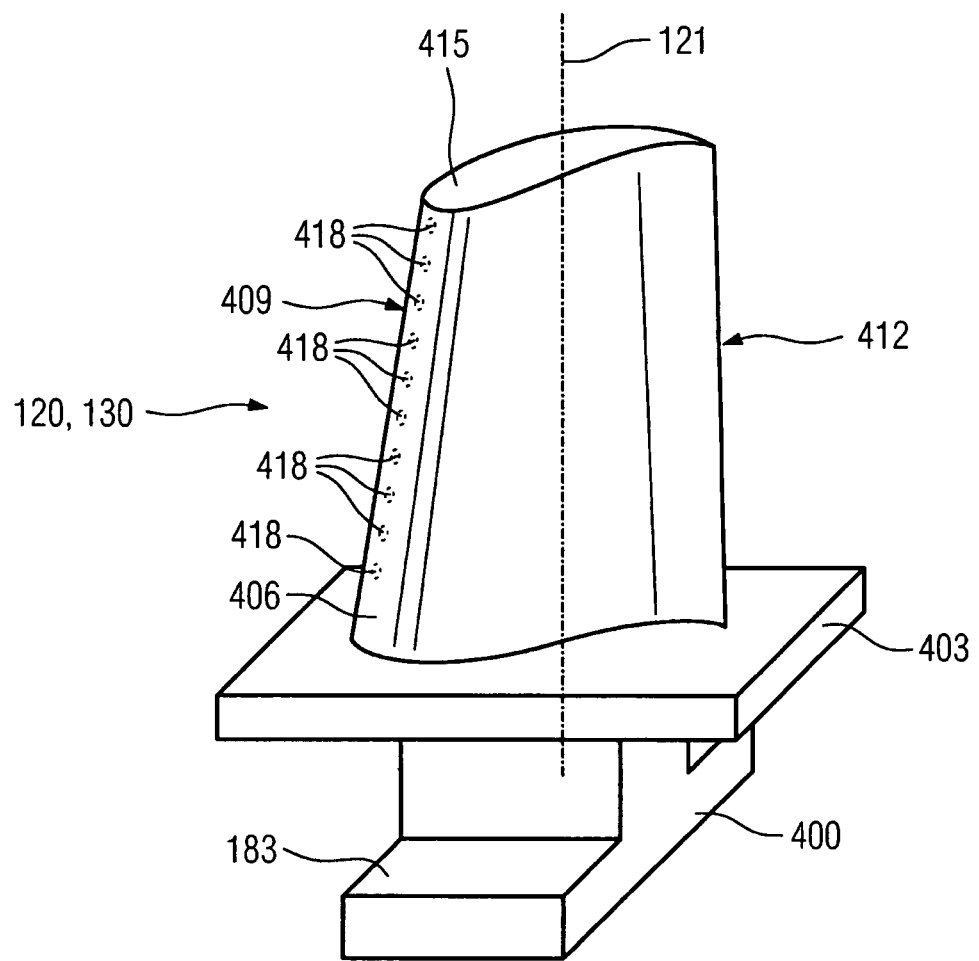
FIG. 6 shows a turbine blade or vane.

FIG. 6 shows a perspective view of a rotor blade 120 or guide vane 130 of a turbomachine, which extends along a longitudinal axis 121.

The turbomachine may be a gas turbine of an aircraft or of a power plant for generating electricity, a steam turbine or a compressor.

The blade or vane 120, 130 has, in succession along the longitudinal axis 121, a securing region 400, an adjoining blade or vane platform 403 and a main blade or vane part 406.

As a guide vane 130, the vane 130 may have a further platform (not shown) at its vane tip 415.

A blade or vane root 183, which is used to secure the rotor blades 120, 130 to a shaft or a disk (not shown), is formed in the securing region 400.

The blade or vane root 183 is designed, for example, in hammerhead form. Other configurations, such as a fir-tree or dovetail root, are possible.

The blade or vane 120, 130 has a leading edge 409 and a trailing edge 412 for a medium which flows past the main blade or vane part 406.

In the case of conventional blades or vanes 120, 130, by way of example solid metallic materials are used in all regions 400, 403, 406 of the blade or vane 120, 130.

The blade or vane 120, 130 may in this case be produced by a casting process, also by means of directional solidification, by a forging process, by a milling process or combinations thereof.

Workpieces with a single-crystal structure or structures are used as components for machines which, in operation, are exposed to high mechanical, thermal and/or chemical stresses.

Single-crystal workpieces of this type are produced, for example, by directional solidification from the melt. This involves casting processes in which the liquid metallic alloy solidifies to form the single-crystal structure, i.e. the single-crystal workpiece, or solidifies directionally.

In this case, dendritic crystals are oriented along the direction of heat flow and form either a columnar crystalline grain structure (i.e. grains which run over the entire length of the workpiece and are referred to here, in accordance with the language customarily used, as directionally solidified) or a single-crystal structure, i.e. the entire workpiece consists of one single crystal. In these processes, a transition to globular (polycrystalline) solidification needs to be avoided, since non-directional growth inevitably forms transverse and longitudinal grain boundaries, which negate the favorable properties of the directionally solidified or single-crystal component.

Where the text refers in general terms to directionally solidified microstructures, this is to be understood as meaning both single crystals, which do not have any grain boundaries or at most have small-angle grain boundaries, and columnar crystal structures, which do have grain boundaries running in the longitudinal direction but do not have any transverse grain boundaries. This second form of crystalline structures is also described as directionally solidified microstructures (directionally solidified structures).

Processes of this type are known from U.S. Pat. No. 6,024, 792 and EP 0 892 090 A1.

Refurbishment means that after they have been used, protective layers may have to be removed from components 120, 130 (e.g. by sand-blasting). Then, the corrosion and/or oxidation layers and products are removed. If appropriate, cracks in the component 120, 130 are also repaired. This is followed by recoating of the component 120, 130, after which the component 120, 130 can be reused.

The blade or vane 120, 130 may be hollow or solid in form. If the blade or vane 120, 130 is to be cooled, it is hollow and may also have film-cooling holes 418 (indicated by dashed lines).

To protect against corrosion, the blade or vane 120, 130 has, for example, corresponding, generally metallic coatings (MCrAlX), which can be treated by means of the process according to the invention, and to protect against heat it generally also has a ceramic coating.

Figure 7:
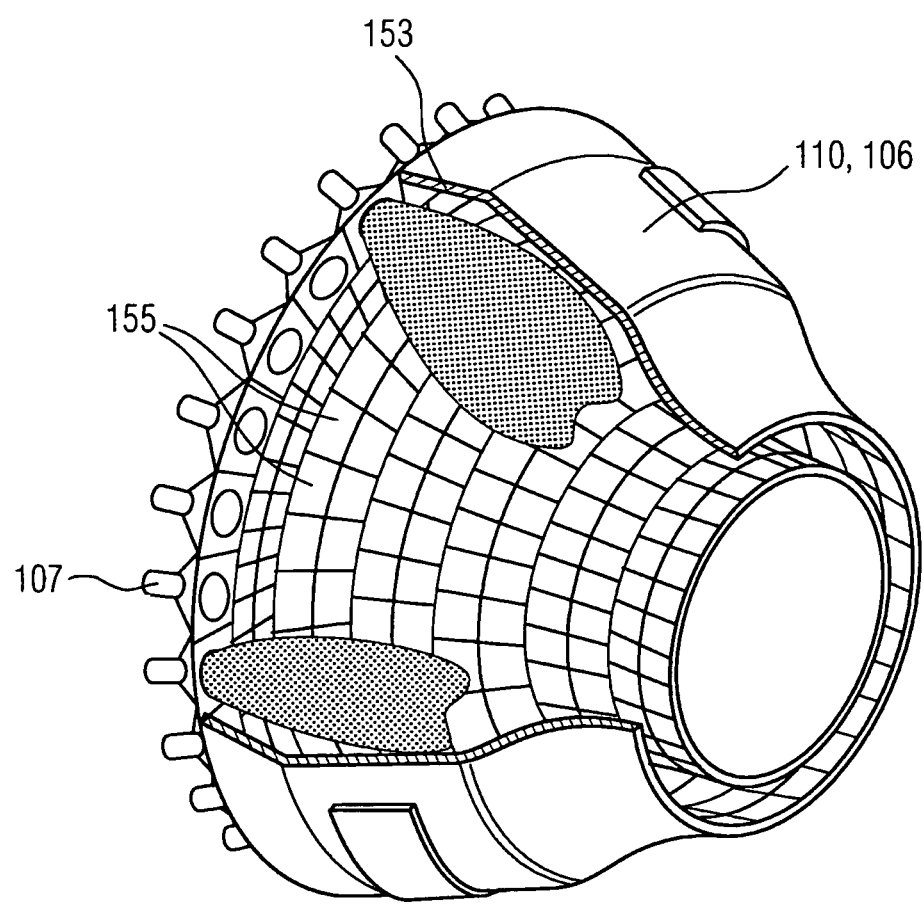
FIG. 7 shows a combustion chamber element.

FIG. 7 shows a combustion chamber 110 of a gas turbine. The combustion chamber 110 is configured, for example, as what is known as an annular combustion chamber, in which a multiplicity of burners 102 arranged circumferentially around the turbine shaft 103 open out into a common combustion chamber space. For this purpose, the combustion chamber 110 overall is of annular configuration positioned around the turbine shaft 103.

To achieve a relatively high efficiency, the combustion chamber 110 is designed for a relatively high temperature of the working medium M of approximately 1000° C. to 1600° C. To allow a relatively long service life even with these operating parameters, which are unfavorable for the materials, the combustion chamber wall 153 is provided, on its side which faces the working medium M, with an inner lining formed from heat shield elements 155. On the working medium side, each heat shield element 155 is equipped with a particularly heat-resistant protective layer or is made from material that is able to withstand high temperatures. On account of the high temperatures inside the combustion chamber 110, a cooling system is additionally provided for the heat shield elements 155 or for their holding elements.

The materials of the combustion chamber wall and their coatings may be similar to those of the turbine blades or vanes.

Figure 8:
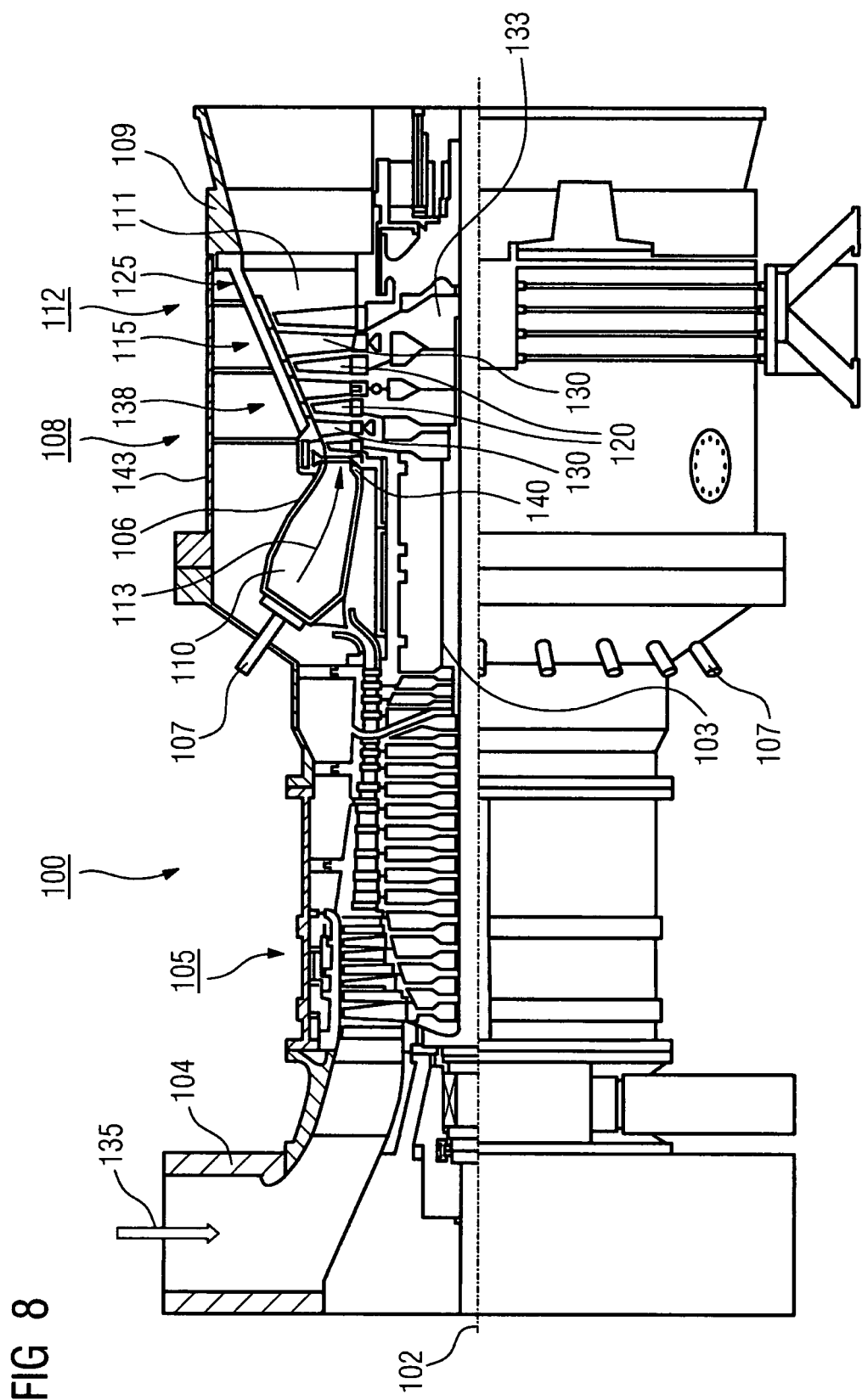
FIG. 8 shows a gas turbine.

FIG. 8 shows, by way of example, a partial longitudinal section through a gas turbine 100.

In the interior, the gas turbine 100 has a rotor 103 which is mounted such that it can rotate about an axis of rotation 102 and is also referred to as the turbine rotor.

An intake housing 104, a compressor 105, a, for example, toroidal combustion chamber 110, in particular an annular combustion chamber 106, with a plurality of coaxially arranged burners 107, a turbine 108 and the exhaust-gas housing 109 follow one another along the rotor 103.

The annular combustion chamber 106 is in communication with a, for example, annular hot-gas passage 111, where, by way of example, four successive turbine stages 112 form the turbine 108.

Each turbine stage 112 is formed, for example, from two blade or vane rings. As seen in the direction of flow of a working medium 113, in the hot-gas passage 111 a row of guide vanes 115 is followed by a row 125 formed from rotor blades 120.

The guide vanes 130 are secured to an inner housing 138 of a stator 143, whereas the rotor blades 120 of a row 125 are fitted to the rotor 103 for example by means of a turbine disk 133.

A generator (not shown) is coupled to the rotor 103.

While the gas turbine 100 is operating, the compressor 105 sucks in air 135 through the intake housing 104 and compresses it. The compressed air provided at the turbine-side end of the compressor 105 is passed to the burners 107, where it is mixed with a fuel. The mix is then burnt in the combustion chamber 110, forming the working medium 113. From there, the working medium 113 flows along the hot-gas passage 111 past the guide vanes 130 and the rotor blades 120. The working medium 113 is expanded at the rotor blades 120, transferring its momentum, so that the rotor blades 120 drive the rotor 103 and the latter in turn drives the generator coupled to it.

While the gas turbine 100 is operating, the components which are exposed to the hot working medium 113 are subject to thermal stresses. The guide vanes 130 and rotor blades 120 of the first turbine stage 112, as seen in the direction of flow of the working medium 113, together with the heat shield bricks which line the annular combustion chamber 106, are subject to the highest thermal stresses.

To be able to withstand the temperatures which prevail there, they have to be cooled by means of a coolant.

Substrates of the components may likewise have a directional structure, i.e. they are in single-crystal form (SX structure) or have only longitudinally oriented grains (DS structure).

By way of example, iron-base, nickel-base or cobalt-base superalloys are used as material for the components, in particular for the turbine blade or vane 120, 130 and components of the combustion chamber 110.

Superalloys of this type are known, for example, from EP 1 204 776 B1, EP 1 306 454, EP 1 319 729 A1, WO 99/67435 or WO 00/44949; these documents form part of the disclosure.

The blades or vanes 120, 130 may also have coatings which protect against corrosion (MCrAlX; M is at least one element selected from the group consisting of iron [Fe], cobalt [Co], nickel [Ni], X is an active element and represents yttrium [Y] and/or silicon and/or at least one rare earth element or hafnium [Hf]), which can be treated using the process according to the invention.

Alloys of this type are known from EP 0 486 489 B1, EP 0 786 017 B1, EP 0 412 397 B1 or EP 1 306 454 A1, which are intended to form part of the present disclosure.

A thermal barrier coating, consisting for example of $ZrO_2$, $Y_2O_4$—$ZrO_2$, i.e. unstabilized, partially stabilized or completely stabilized by yttrium oxide and/or calcium oxide and/or magnesium oxide, may also be present on the MCrAlX. Columnar grains are produced in the thermal barrier coating by suitable coating processes, such as for example electron beam physical vapor deposition (EB-PVD).

The guide vane 130 has a guide vane root (not shown here), which faces the inner housing 138 of the turbine 108, and a guide vane head which is at the opposite end from the guide vane root. The guide vane head faces the rotor 103 and is fixed to a securing ring 140 of the stator 143.

The invention claimed is:

1. A process for producing a metallic component, comprising:
   providing a metallic substrate;
   providing a metallic coating including a corrosion-resistant layer of the MCrAlX type on the metallic substrate;
   preheating a treatment fluid to at most 80° C.;
   depleting at least one element that forms a metal oxide in a region of an outer surface of the metallic coating by bringing the outer surface into contact with the treatment fluid;
   limiting the duration of contact of the treatment fluid with the outer surface to at most 1 hour;
   forming an oxide layer of metal oxides on the outer surface due to the depletion of the at least one element; and
   applying an outer ceramic layer to the oxide layer.

2. The process as claimed in claim 1, wherein the treatment fluid temperature is 50° C.

3. The process as claimed in claim 1, wherein the treatment duration is limited to 0.5 hour.

4. The process as claimed in claim 1, wherein the treatment fluid is an acid or an acid mixture.

5. The process as claimed in claim 1, wherein the treatment fluid comprises at least one base.

6. The process as claimed in claim 5, wherein the treatment fluid is an electrolyte and the at least one element is depleted in the component by an electrolytic treatment.

7. The process as claimed in claim 5, wherein the component is exposed to at least one halogen or at least one halide in the treatment fluid, and wherein the treatment fluid comprises the base and the halogen or halide.

8. The process as claimed in claim 1, wherein the at least one element is aluminum.

9. The process as claimed in claim 1, wherein the at least one element is chromium.

10. The process as claimed in claim 1, wherein the at least one element is chromium and aluminum.

11. The process as claimed in claim 1, wherein the metallic substrate is made from an iron-base, cobalt-base or nickel-base superalloy.

12. The process as claimed in claim 11, wherein the corrosion-resistant layer is depleted of at least one element, and wherein the at least one element is aluminum.

13. The process as claimed in claim 12, wherein the corrosion-resistant layer and/or a substrate is aluminized and/or chromized.

14. The process as claimed in claim 12, wherein the component is a turbine blade, vane or heat shield element.

* * * * *